March 2, 1948. E. J. HERBERT 2,437,159
COMBINED SUN SHADE AND REFLECTOR FOR CAMERAS
Filed Aug. 8, 1945

INVENTOR.
EDWARD J. HERBERT
BY John P. Chandler
his ATTORNEY

Patented Mar. 2, 1948

2,437,159

UNITED STATES PATENT OFFICE 2,437,159

COMBINED SUNSHADE AND REFLECTOR FOR CAMERAS

Edward J. Herbert, Scarsdale, N. Y.

Application August 8, 1945, Serial No. 609,538

1 Claim. (Cl. 95—18)

This invention relates to the photographic arts, and relates more particularly to an improved combination device which may be used in connection with a camera, and which will serve as a light shield for the lens and will also provide novel means for securing unusual effects in the nature of a reflection simulating the presence of water.

The device is adapted to be attached to the forward end of the lens barrel, and is so arranged as to be quickly mounted on lens barrels of varying diameters. The device is of generally cylindrical shape, but is preferably of greater diameter at its forward end than at its rear end, which latter is mounted on the lens barrel. A plurality of arcuate fingers are mounted on the inner surface of this rear terminal portion, and are arranged to be moved radially inwardly to engage the external cylindrical surface of the barrel with a snug friction fit. The outer end of the device, which, as aforesaid, is of greater diameter than the inner end, projects a reasonable distance from the lens, and may be used as a sunshade or light shield during ordinary photographic operations.

An insertable member is arranged to be received within such forward end, such member having a substantially flat, downwardly and inwardly-inclined upper polished surface. The forward end of such member extends substantially one-half the height of the device. When the insertable member is in place and a picture is taken, substantially one-half of the image is exposed on the sensitized plate, and the remaining portion exposed on the plate is in the nature of a reflected image of the first image and gives the effect of a reflection of the main image in still water.

Figure 1:
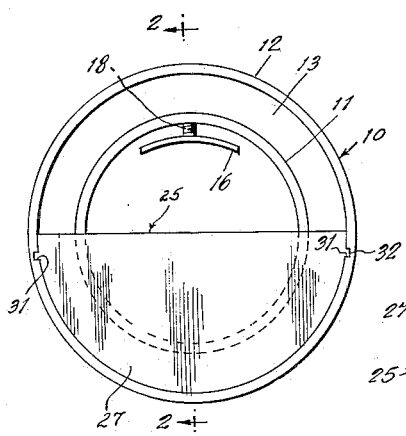
Fig. 1 is a front elevation of one embodiment of the present invention.

The device of the present invention comprises a cylindrical member 10 which forms a shield. The shield includes a rear annular portion 11, and a front annular portion 12 of somewhat greater diameter than portion 11, the two portions being connected by an intermediate outwardly-flared portion 13. The inner surface of rear annular portion 11 is preferably provided with a plurality of arcuate recesses 15, each of which receives an arcuate finger 16 of such shape and contour as to fit substantially completely within the confines of the recess. Substantially midway between the ends of each recess a threaded aperture 17 is provided, such aperture receiving a threaded screw 18 having a knurled head 19. The screw at its opposite end carries the finger 16, the connection between the screw and the finger being sufficiently loose to permit rotation of the screw relative to the finger.

Figure 2:
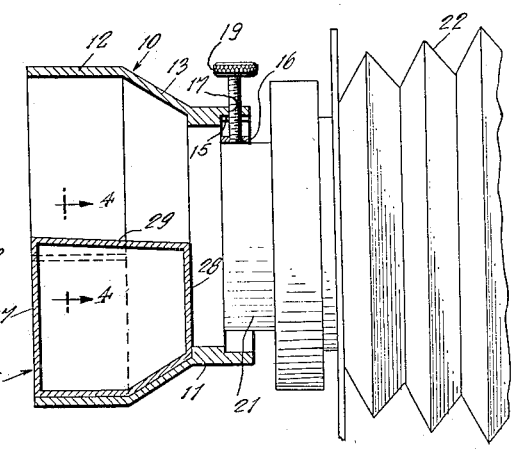
Fig. 2 is a section taken on line 2—2 of Fig. 1, the view showing the device in position on the lens barrel of a camera.
Figure 3:
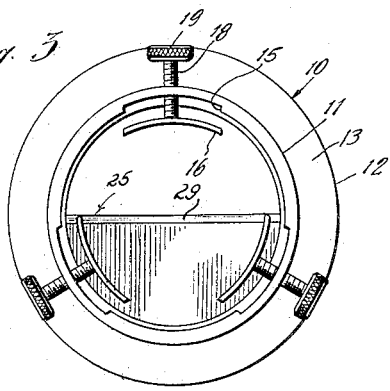
Fig. 3 is a rear elevation of the device.
Figure 4:
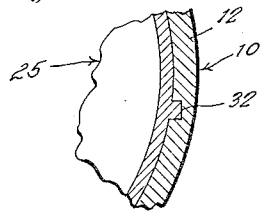
Fig. 4 is a broken section taken on line 4—4 of Fig. 2.
Figure 5:
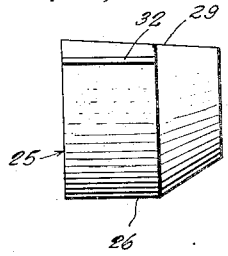
Fig. 5 is a side elevation of the insertable member.
Figure 6:
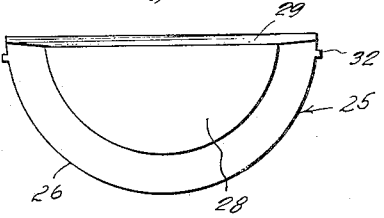
Fig. 6 is a rear elevation thereof.

When the fingers are in their fully retracted position, the interior of the member 11 is substantially circular, and in the event that the lens barrel of the camera is of substantially the same diameter as such inner periphery, the device may be frictionally held on such lens barrel. In many instances, however, the lens barrel will be of somewhat lesser diameter, as is shown at 21 in Fig. 2. Thus, to mount the device upon the lens barrel the screws 18 are rotated to move the fingers inwardly, and the device may thus be firmly secured on the lens barrel.

In the event that the device is to be used merely as a light shield, it is mounted on the lens barrel in the manner just described, and it is then ready for use. In the event, however, that it is desired to provide the artificial reflections previously mentioned, an insertable member 25 is employed. This member has an arcuate wall 26 which is complementary to the inner surface of portions 12 and 13 of the cylindrical member 10. It is further formed with a front wall 27 which is of a height equal to substantially half the inner diameter of portion 12. The rear wall 28 is somewhat more shallow, and the interconnecting upper wall 29 is slightly downwardly and rearwardly inclined. This upper surface is preferably given a relatively high polish. For the purpose of securing member 26 in the position indicated more firmly and for preventing relative rotation between the parts, there are formed on opposite sides of inner surface of portion 12 longitudinal recesses 31, which recesses receive splines 32 formed on the outer surface of member 25. Any other equivalent means may be employed in place of the splines and recesses.

The method of using the combination device will be largely clear from the foregoing description. When the insertable member 25 is in place, the front wall 27 cuts out the lower portion of the image. In its place, however, is produced a novel effect which appears to be a water reflection of the image passing through the upper half of the shield. Many unusual pictures will be obtained by employing the device of the present invention. By turning the attachment so that the reflected surface is perpendicular, it is possible to make a reflected picture of a person or object as though the person being photographed were shaking hands with himself or adjusting his clothing in front of a mirror, although there is no mirror present, the "mirror" being furnished by surface 29 on the insertable member 25.

While one form or embodiment of the invention has been shown and described herein for illustrative purposes, and the construction and arrangement incidental to a specific application thereof have been disclosed and discussed in detail, it is to be understood that the invention is limited neither to the mere details or relative arrangement of parts, nor to its specific embodiment shown herein, but that extensive deviations from the illustrated form or embodiment of the invention may be made without departing from the principles thereof.

What I claim is:

A combined sunshade and reflection producing device for attachment to the lens barrel of a camera or the like, and comprising a generally cylindrical housing provided with a rear section, a forward section of greater diameter and an intermediate tapered section, the inner surface of the rear section having a plurality of spaced, arcuate recesses, the rear section having threaded apertures terminating in such recesses, headed screws mounted within such apertures, and arcuate fingers rotatably mounted at the inner ends of such screws, whereby the housing may be secured to lens barrels of varying diameters, and a second member which is receivable in the forward section and provided with a mirrored upper wall disposed substantially midway between the upper and lower ends of the housing and being downwardly inclined towards the rear of such wall, such member being further provided with front and rear vertical walls and arcuate side walls, the side walls and the inner surface of the forward section of the housing being provided with cooperating splines and recesses receiving such splines.

EDWARD J. HERBERT.

REFERENCES CITED

The following references are of record in the file of this patent:

UNITED STATES PATENTS

| Number | Name | Date |
|---|---|---|
| 1,755,036 | Sussman | Apr. 15, 1930 |
| 2,014,322 | Foulis et al. | Sept. 10, 1935 |
| 2,143,125 | Headlee | Jan. 10, 1939 |